(12) United States Patent
Chandrasekaran

(10) Patent No.: US 9,880,716 B2
(45) Date of Patent: Jan. 30, 2018

(54) USER-SELECTABLE QUASI-PERMANENT PARTIAL OVERLAP OF USER INTERFACE DISPLAY

(71) Applicant: VERIZON PATENT AND LICENSING INC., Arlington, VA (US)

(72) Inventor: Arthanari Chandrasekaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 546 days.

(21) Appl. No.: 14/476,413

(22) Filed: Sep. 3, 2014

(65) Prior Publication Data

US 2016/0062561 A1 Mar. 3, 2016

(51) Int. Cl.
*G06F 3/048* (2013.01)
*G06F 3/0484* (2013.01)
*G06F 3/0488* (2013.01)

(52) U.S. Cl.
CPC ........ *G06F 3/04842* (2013.01); *G06F 3/0488* (2013.01); *G06F 3/04883* (2013.01)

(58) Field of Classification Search
CPC ................................ G06F 3/0481; G09G 5/14
See application file for complete search history.

(56) References Cited

U.S. PATENT DOCUMENTS

| | | | | |
|---|---|---|---|---|
| 5,651,107 A * | 7/1997 | Frank | ................... | G06F 3/0481 345/589 |
| 6,452,609 B1 * | 9/2002 | Katinsky | ........... | G06F 17/30053 707/E17.001 |
| 7,257,777 B1 * | 8/2007 | Kanevsky | ............. | G06F 9/4443 715/790 |
| 7,319,454 B2 * | 1/2008 | Thacker | .............. | G06F 3/04883 345/163 |
| 7,900,158 B2 * | 3/2011 | Ngari | ................... | G06F 3/0481 345/629 |
| 8,201,098 B1 * | 6/2012 | Bollman | .............. | G06Q 10/107 715/751 |

OTHER PUBLICATIONS

"SnagIt, Getting Started Guide", TechSmith, 2013, hereinafter "SnagIt".*

* cited by examiner

*Primary Examiner* — Matthew Ell

(57) ABSTRACT

A method includes displaying via a processor a user interface on a display screen of a computing device, detecting a selection of a portion of the first user interface, generating a clip configured to include the selected portion of the user interface as content. The method further includes displaying the generated clip on the display screen to enable a user of the mobile device to review the content, and maintaining the display of the generated clip on the display screen even after the user interface is no longer displayed on the display screen.

20 Claims, 14 Drawing Sheets

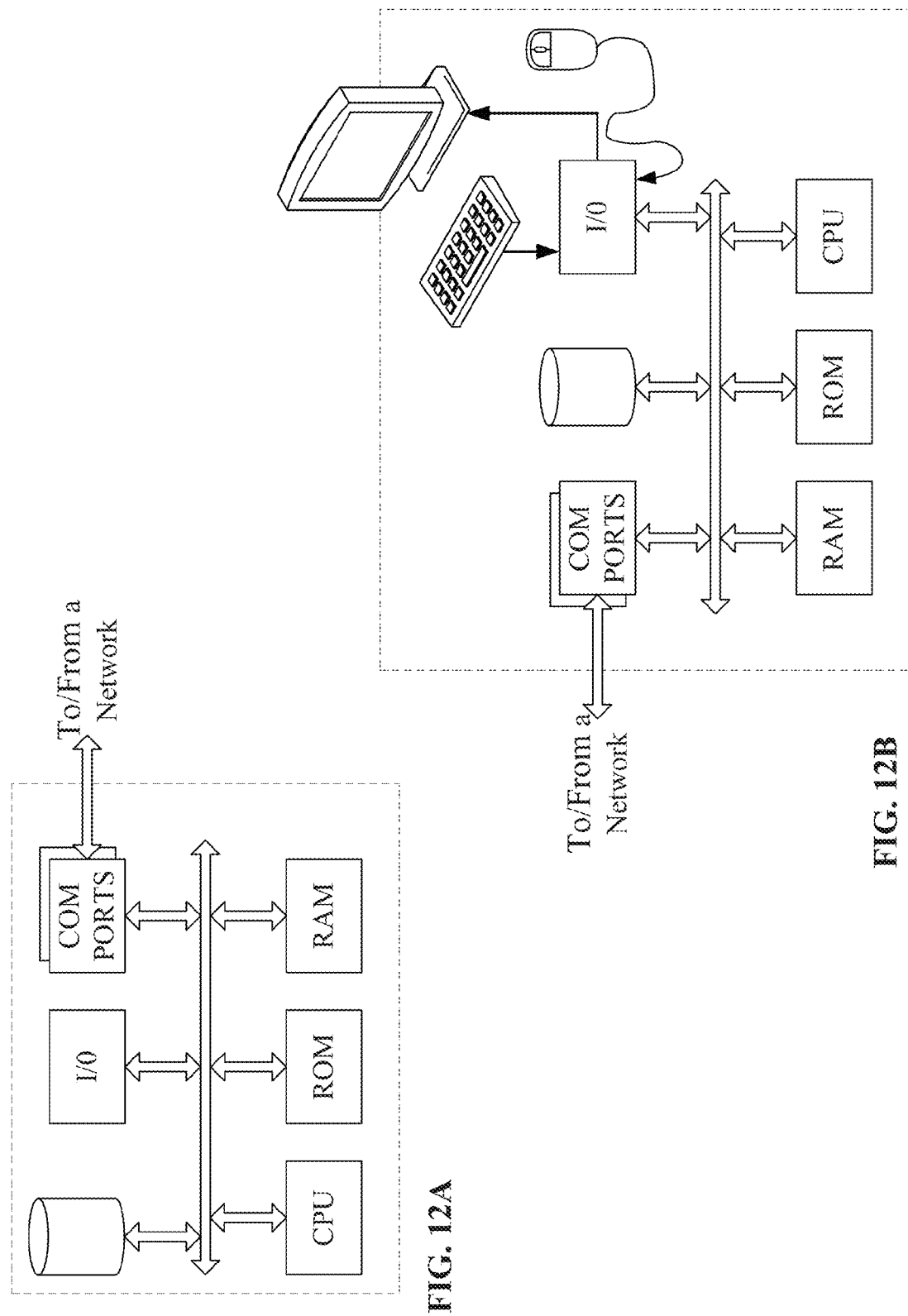

USER-SELECTABLE QUASI-PERMANENT PARTIAL OVERLAP OF USER INTERFACE DISPLAY

BACKGROUND

Unless otherwise indicated herein, the materials described in this section are not prior art to the claims in the present application and are not admitted to be prior art by inclusion in this section.

With the recent development of digital technology, mobile devices such as a smart phone, a Personal Computer (PC), and the like, each capable of processing communication and launching applications regardless of whether or not a user is moving, have been introduced. As known, smartphone users typically rely on their phones as a primary tool for many types of data collection activities. For example, users commonly utilize applications and browsers when seeking particular information about a product. This may create several scenarios requiring multi-tasking, especially juggling between applications and Web pages, to seek desirable contents.

However, due to the limited size of the display screen of a touch-screen device, the user may not be able to display as many applications or/and web pages on the touch-screen device as desired in order to keep viewing information needed to perform a particular task. Therefore, the user may not be able to easily perform the particular task.

Hence, a need exists for a method and apparatus that allow a user of a computing device to achieve a particular task on the display screen using information collected from many applications and web pages displayed thereon separately.

BRIEF DESCRIPTION OF THE DRAWINGS

The drawing figures depict one or more implementations in accord with the present teachings, by way of example only, not by way of limitation. In the figures, like reference numerals refer to the same or similar elements;

FIG. 12A is a simplified functional block diagram of a computer that may be configured as a host or server, for example, to function as the data provider in the system of FIG. 1;

FIG. 12B is a simplified functional block diagram of a personal computer or other work station or terminal device.

DETAILED DESCRIPTION OF THE DRAWINGS

Figure 1:
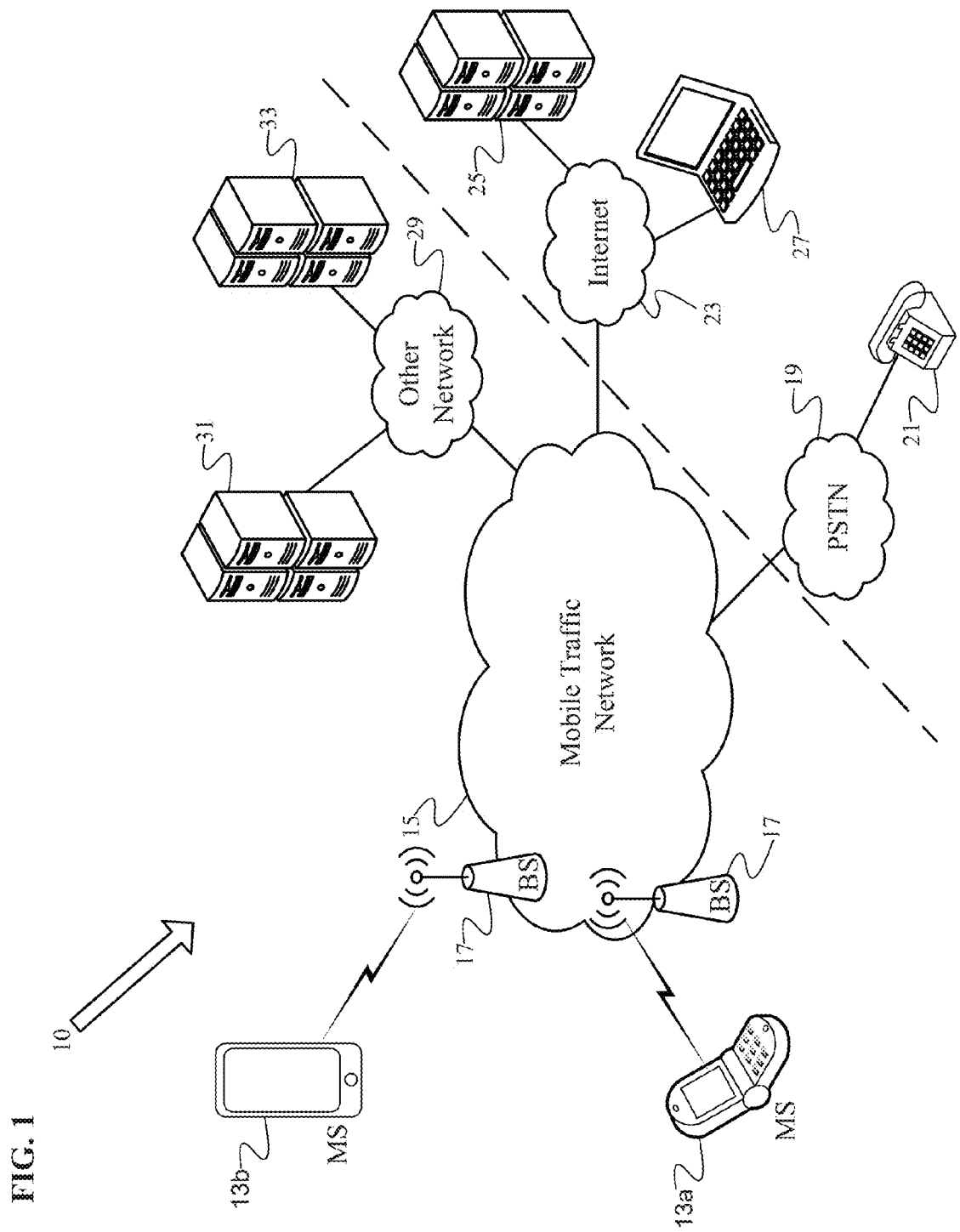
FIG. 1 is a high-level functional block diagram of an exemplary system of networks/devices that provide various communications for mobile stations to support access and collection by the mobile stations of desired information from multiple sources.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a technology for selecting and freezing a particular part (i.e., portion) of a user interface to remain on the display screen until cancelled. As stated above, due to a small display screen, a mobile device may be able to display a user interface of only one application at a given time and the user may have to toggle between user interfaces of various applications to accomplish a specific task. An additional application may be displayed through a pop-up. A pop-up is a graphical user interface (GUI), usually a small window, which can suddenly appear ("pop up") in the foreground of the visual interface. Pop-ups can be initiated by a single or double mouse clicking or a mouse rollover, and also possibly by voice command or can simply be timed to occur. A pop-up can be a replacement user interface when its window is not smaller than the background window or interface.

To this end, although a plurality of applications can be simultaneously executed, only one application view may be displayed on a current screen according to the user selection. Recently, the usability of mobile devices have been improved by enabling a splitting of a screen into at least two windows to arrange and display a plurality of applications or a plurality of web pages or any combination thereof. However, because of the small size of the screen, the splitting of the screen into a multitude of windows leads to a shrinking of the displayed images and fonts, thereby reducing the ability of the users to identify and keep viewing relevant information displayed in the plurality of windows.

While using a mobile device, a user may need to utilize information associated with various applications to perform a given task. For example, a user may have to check information displayed in a user interface of one application displayed on one part of a screen in order to update a user interface of another application displayed on another part of the same screen.

In one specific example, the user may wish to simultaneously watch on a first user interface a YouTube video that provides information about a product and check on second user interface information about the same or a similar product. The second user interface may be an interface associated with YouTube or may be an interface associated with another application. In another specific example, when the user is seeking to purchase a particular product, he/she may need to access a plurality of sites, remember information for similar products listed in those sites, and then compare the respective information of the similar products before making any decision as to which of one the plurality of similar products is worth acquiring. In the illustrated examples, although the user may wish to view the various user interfaces simultaneously to facilitate the comparison of the same or similar products, for example, the user may not be able to do so due to a limited size of the display on the device. To this end, the user may only view one user interface at a given time and may have to remember the content of that user interface for purposes of later comparison of that content to the content of another user interface which may be later viewed by the user.

In accordance with the present disclosure, in order to facilitate the comparison of the same or similar products discovered in a plurality of sites and their respective prices, the user may create a clip from a displayed web page associated with one of the sites. The created clip may be marked automatically or manually by the user to remain on the screen while the user navigates away from the displayed web page and replaces the displayed web page with another web page corresponding to another site or other web pages corresponding to other sites. This may allow the user to perform a comparison of the content of the created clip with information provided by each displayed web page.

The created clip represents a screen shot of a particular part of a displayed web page or a user interface selected by the user by a particular touch gesture on the displayed web page or user interface when the mobile device includes a touch screen. Alternatively, the creation of the clip may be performed by a finger movement on an area of a touch pad corresponding to the particular part, through a movement of a mouse around the particular part, or via a voice command input. The user can create additional clips from the other web pages or user interfaces, and may mark them to remain on the screen while their corresponding web pages or user interfaces will disappear from the screen.

As such, once all of the desired clips have been marked to remain on the screen, the user can see all the clips on the screen, analyze them, cancel the ones that he/she does not want, and select at least one clip that may provide a preferred product. As such, by marking a plurality of clips of relevant information to remain on the screen, the user may not need to toggle between various web pages and/or user interfaces to refresh the user's memory regarding, for example, prices of the desired product and corresponding information and to make an ultimate decision as to which product to purchase. This may reduce a potential confusion and distraction when trying to remember the various product prices and essential information provided by the accessed sites.

Accordingly, the above-discussed procedure of generating and keeping a set of clips on screen allows a user who would like to use his/her mobile/tablet/desktop/laptop and television screens to compare and review particular information in a quick and efficient fashion. Thus, this procedure provides the user a quick access to simple but essential pieces of information saved in respective clips, and is flexible to use at the user's will in any screen to compare the necessary information and to make better decisions in a hassle free manner. Reference now is made in detail to the examples illustrated in the accompanying drawings and discussed below. FIG. 1 illustrates a system 10 offering a variety of mobile communication services to support access and collection by the mobile stations of desired information from multiple sources. The example shows simply two mobile stations (MSs) 13a and 13b as well as a mobile communication network 15. The mobile stations 13a and 13b are examples of mobile stations that may be used for creating clips from displayed screens and allowing the created clips to remain on the display as the user navigates away from their respective screens. In one implementation, the clips may remain on the display until canceled by the user.

The network 15 provides mobile wireless communications services to stations 13a and 13b as well as to other mobile stations (not shown), for example, via a number of base stations (BSs) 17. The present techniques may be implemented in any of a variety of available mobile networks 15 and/or on any type of mobile station compatible with such a network 15, and the drawing shows only a very simplified example of a few relevant elements of the network 15 for purposes of discussion here.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13a and 13b may be capable of voice and data communications through the network 15.

The network 15 allows users of the mobile stations such as 13a and 13b (and other mobile stations not shown) to initiate and receive telephone calls to each other as well as through the public switched telephone network or "PSTN" 19 and telephone stations 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile stations 13a and 13b via the Internet 23 may be with devices like those shown at 25 and 27 as well as with a variety of other types of devices or systems capable of data communications through various interconnected networks.

Mobile stations 13a and 13b can take the form of portable handsets, smart-phones or personal digital assistants, although they may be implemented in other form factors. Program applications, including an application to assist in the selection and marking of particular parts of displayed screens to remain (i.e., freeze) on their respective screens until cancelled can be configured to execute on many different types of mobile stations 13a and 13b. For example, a mobile station application can be written to execute on a binary runtime environment for mobile (BREW-based) mobile station, a Windows Mobile based mobile station, Android, I-Phone, Java Mobile, or RIM based mobile station such as a BlackBerry or the like. Some of these types of devices can employ a multi-tasking operating system.

The mobile communication network 10 can be implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13a and 13b, can include one or more RANs and a regional circuit and/or packet switched network and associated signaling network facilities.

Physical elements of a RAN, operated by one of the mobile service providers or carriers, include a number of base stations represented in the example by the base stations (BSs) 17. Although not separately shown, such a base station 17 can include a base transceiver system (BTS), which can communicate via an antennae system at the site of base station and over the airlink with one or more of the mobile stations 13, when the mobile stations are within range. Each base station can include a BTS coupled to several antennae mounted on a radio tower within a coverage area often referred to as a "cell." The BTS is the part of the radio network that sends and receives RF signals to/from the mobile stations 13 that are served by the base station 17.

The radio access networks can also include a traffic network represented generally by the cloud at 15, which carries the user communications and data for the mobile stations 13 between the base stations 17 and other elements with or through which the mobile stations 13 communicate. The network 15 can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., the public switched telephone network (PSTN) and the Internet) either directly or indirectly.

The carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. A person skilled in the art, however, would recognize that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile station 13a or 13b communicates over the air with a base station 17 and through the traffic network 15 for various voice and data communications, e.g. through the Internet 23 with a server 25 and/or with application servers 31. The mobile service carrier may offer a select and freeze application (hereafter referred to as a clip mode application) 35, which is configured to detect a selection by a user of a particular part of a user interface, and create and freeze a corresponding clip on the screen of the computing device.

The clip mode application 35 may be hosted on a carrier operated application server 31, as shown in FIG. 1, for communication via the networks 15 and 29. Alternatively, the clip mode application 35 may be provided by a separate entity (alone or through agreements with the carrier), in which case, the clip mode application 35 may be hosted on an application server such as server 25 connected for communication via the networks 15 and 23. In yet another alternative, the clip mode application 35 may be hosted on a mobile station 13a or 13b. Server such as 25 and 31 may provide any of a variety of common application or service functions in support of or in addition to an application program running on the mobile station 13. However, for purposes of further discussion, we will focus on functions thereof in support of the clip mode application 35.

To insure that the clip mode application 35 offered by server 31 is available to only authorized devices/users, the provider of the clip mode application 35 also deploys an authentication server 33. The authentication server 33 could be a separate physical server as shown, or authentication server 33 could be implemented as another program module running on the same hardware platform as the server application 31. Essentially, when the server application (server 31 in our example) receives an application request from a client device on a mobile station 13, the server application provides appropriate information to the authentication server 33 to allow server application 33 to authenticate the mobile station 13 as outlined herein. Upon successful authentication, the server 33 informs the server application 31, which in turn provides access to the clip mode application 35 through the various communication elements (e.g. 29, 15 and 17) of the network 10.

The clip mode application 35 under consideration here may be delivered to touch screen type mobile stations. Alternatively or additionally, the clip mode application 35 under consideration may be delivered to non-touch type mobile stations. Hence, our simple example shows the mobile station 13b as a touch screen type mobile station.

Those skilled in the art presumably are familiar with the structure, programming and operations of the various types of mobile stations. However, for completeness, it may be useful to consider the functional elements/aspects of two exemplary mobile stations 13a and 13b, at a high-level.

Figure 2A:
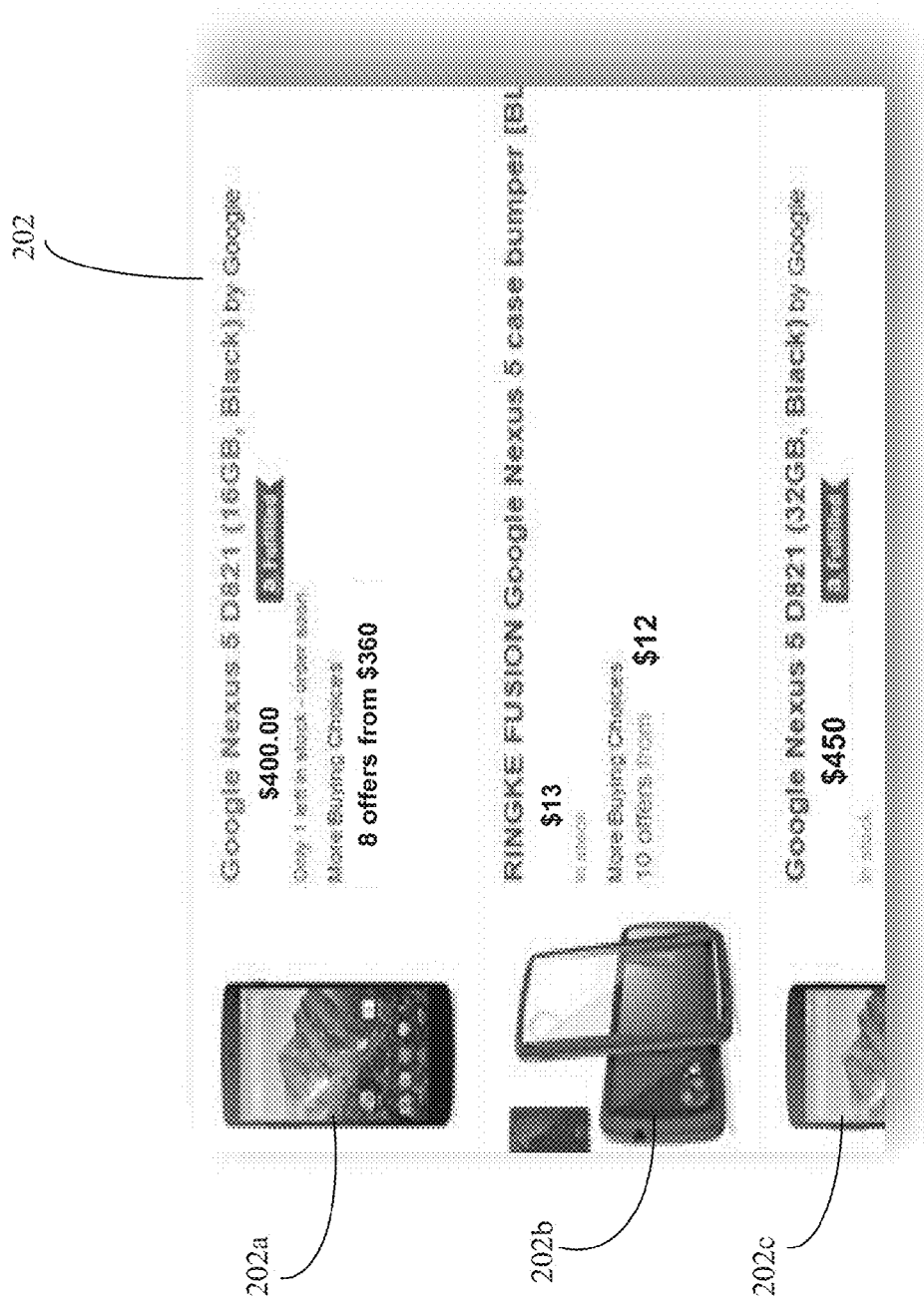
FIGS. 2A-2B illustrate exemplary screens for displaying web pages associated with sites accessed to find a desirable mobile device.
Figure 2B:

FIGS. 2A and 2B respectively illustrate two exemplary user interfaces 202 and 203 that may be displayed on a display screen of a mobile device (e.g., mobile station 13a or 13b). Each user interface 202 and 203 includes information about at least one mobile device for sale. During an on-line search for a desirable mobile device, for example, the user may decide to access a plurality of web sites using a browser application installed on the mobile device to locate a variety of for-sale mobile devices and their corresponding essential information.

In FIG. 2A, the user has accessed a first web site which resulted in a user interface 202 being displayed on the display screen of the mobile device. The user interface 202 includes a plurality of for-sale mobile devices 202a, 202b, and 202c. Each mobile device 202a, 202b, and 202c includes a graph and a text associated with a specific mobile device. The graph shows the physical appearance of the mobile device while the text shows the specific features of the mobile device. The specific features may include price information and operating system associated with the mobile device. The specific features may also include information regarding how many of such mobile devices are available for purchase and how many can be bought together with reduced prices.

In FIG. 2B, the user has accessed a second web site which resulted in a user interface 203 being displayed on the display screen of the mobile device. The user interface 203 may be an alternate web page associated with another accessed site and may include a single for-sale mobile device 203*a* and its associated essential information. In one specific example, the user may access multiple web sites when searching for a particular mobile device. To this end, the user may have multiple user interfaces opened on the mobile device. However, given limited display capability of the mobile device, only one user interface may be active at a given time. For example, when the user interface 203 is shown on the display screen of the mobile device, the user interface 202 may be minimized. Alternatively, when the user interface 202 is shown on the display screen of the mobile device, the user interface 203 may be minimized. This may require the user to toggle back and forth between various user interfaces (e.g., user interfaces 202 and 203) to make a final determination which mobile device to purchase.

As stated above, the user may not be able or want to memorize the viewable information of all four displayed mobile devices, 202*a-c* and 203*a*. As such, it would be convenient if the user could select a first particular part of a first user interface to create a first clip, which includes the first particular part of the first user interface as a first content, and freeze/mark it to remain on the display screen. The user may then move to a second user interface in the same mobile device to compare the first content of the first clip to information displayed in the second user interface.

Alternatively, the user could select a second particular part of the second user interface screen to create a second clip, which includes the second particular part of the second user interface as a second content and freeze/mark the second clip to remain on the display screen. Once displayed, the display of both the first and second clips enables the user to perform a desired operation, which may involve a comparison of the first and second contents contained in the first and second clips, respectively.

Figure 3:
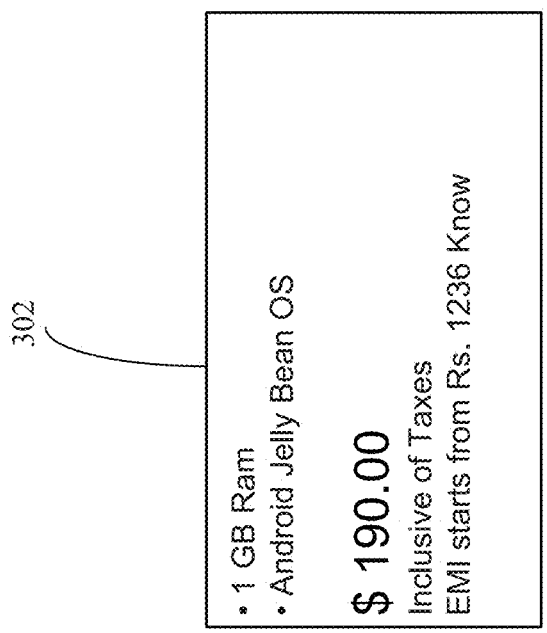
FIG. 3 illustrates an example of a clip created from a particular part of the screen of FIG. 2B, which includes essential information about the mobile device shown in FIG. 2B.

FIG. 3 illustrates an exemplary clip 302 created from a user interface. The clip 302 may be created from the user interface 203 shown in FIG. 2B. The clip 302 may include essential information, such as a price, a rating, a shipping cost, and an equated monthly installment of the particular product that the user has found appealing among the various products the user has viewed on the one or more web pages.

In one example, clip 302 may be created by a touch gesture on user interface 203 when the mobile device includes a touch screen. The touch gesture may include a finger stroke that surrounds an area of user interface 203 that includes the essential information of the particular product. The finger stroke may have a circular shape, and elliptical shape, or a polygonal shape.

In another example, as stated above, the clip 302 may be created by a finger movement sensed by a touch pad (not shown), by a clicking on user interface using a mouse (not shown), or via a voice command input.

Figure 4:
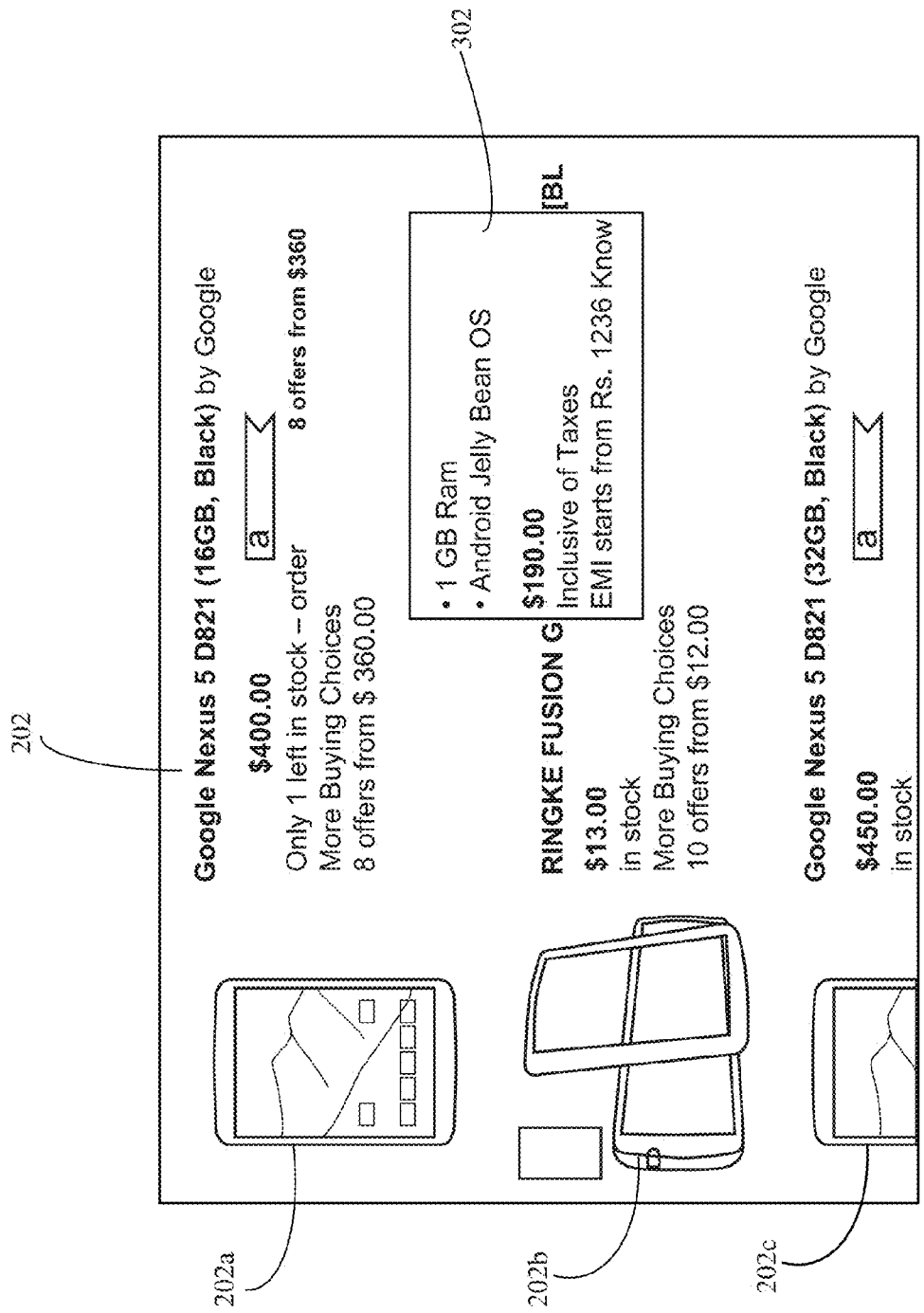
FIG. 4 illustrates a user interface of FIG. 2A whereon the clip of FIG. 3 is displayed.

Once created, the user may then freeze clip 302 by marking it to remain on the display screen going forward until the user decides to cancel it. In one example, the marking of clip 302 may include a tapping on clip 302, and the cancelling of clip 302 may be triggered by a finger stroke on the clip having an "x" shape. Alternatively, once created, clip 302 may automatically remain on the display screen if not cancelled within a predetermined time period after being created. FIG. 4 illustrates a user interface of FIG. 2A on which the clip 302 of FIG. 3 is displayed. In one example, once clip 302 has been created and selected to remain on the display screen, the user can proceed with the opening and viewing of another user interface, for example user interface 202, on which clip 302 will be automatically displayed if it has not been cancelled by the user. The user can choose to keep clip 302 in the same area of the display screen or drag it to another preferred area in order to facilitate an analysis and comparison of the information viewable in clip 302 and in the uncovered area of user interface 202. Regardless of how many additional sites the user may decide to access, the clip 302 will remain on display in a chosen area of a displayed screen until the clip 302 is cancelled.

Figure 5:
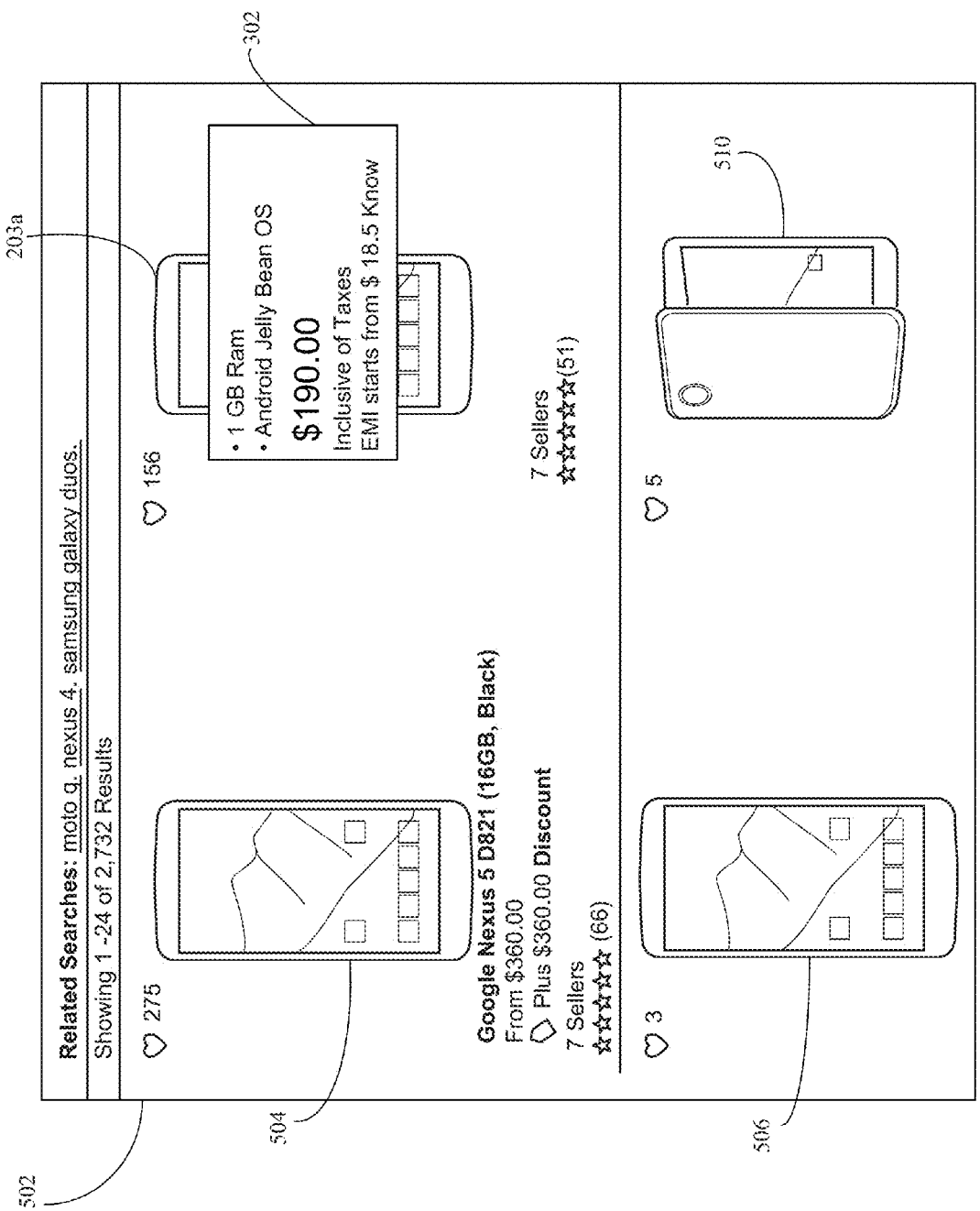
FIG. 5 illustrates another user interface whereon the clip of FIG. 3 is displayed.

FIG. 5 illustrates another user interface screen 502 on which the clip 302 of FIG. 3 is displayed. Each time the user triggers a display of a new user interface 502, he/she may move the clip 302 across the new user interface 502 to a desirable position that would not block the relevant information of the user interface 502. The relevant information of the user interface 702 or any other information of the user interface 502 may be used to create an additional clip, which may be selected and displayed along with the clip 302 as the user navigates away from the user interface 502 to other user interfaces. The clips may remain on the display until they are canceled. The clips may be canceled individually as described above, or together as part of a group using a finger stroke on the display screen having an "x" shape, for example.

The clips may be moved to cover any portion of the displayed user interface. For example, if the displayed user interface includes content similar to the content of the clip, the clip may be moved to cover that content to avoid redundant information being displayed to the user. To this end and as shown in FIG. 5, since the user interface 502 also displays information regarding the mobile device 203*a* for which clip 302 was created, the user may move clip 302 to the area of the user interface 502 where mobile device 203*a* is displayed. This prevents display of redundant information to the user and also prevents the clip 302 from blocking other information that may be of interest to the user such as information associated with mobile devices 504, 506, and 510.

Moreover, in order to minimize a complete visual blocking of an interface area where clip 302 has been positioned, clip 302 may be altered to become somewhat see-through, e.g., 50% to 90% partially transparent, for example. This partial transparency of clip 302 may be performed by another touch gesture, such as a diagonal stroke across clip 302 whose length with respect to a diagonal length of clip 302 represents the desired transparency percentage, on user interface 502 when the mobile device includes a touch screen. In another example, the partial transparency of clip 302 may be performed by a similar diagonal finger movement across clip 302 sensed by the touch pad, by another clicking, such as a number of clicks equal to a tenth of the desired transparency percentage, on clip 302 using the mouse, or via another voice command input, such as stating "fifty percent transparent." When desired, the partial transparency of clip 302 may be reversed/cancelled by a reverse diagonal stroke/finger movement across clip 302 to that used to perform the partial transparency, by clicking twice with a few seconds separating the two clicks, or by stating "cancel transparency" for example.

In accordance with an implementation of the present disclosure, the above-discussed procedure can be created as an application ("app"), which can be downloaded from a server. The app may be downloaded to the mobile device of the user over the air, for example. In another example, the app may be a cloud-based app and may be accessed over the air by the mobile station. In either case, using the app, the user may be able to save the clips that he/she created, as individual clips or as clip groups. The saved clips may be viewed whenever desired as future references. The app, which will be referred to as a clip mode app hereafter, may be automatically initiated when the mobile device is turned on, or initiated by a touching of or a clicking on a corresponding icon, or via a voice command associated with the clip mode app. In an implementation, if the clip mode app is initiated when the mobile device is turned on, when the user opens a web page the clip mode app is configured to display a button on the web page indicated that it is activated. In alternative implementation, if the clip mode app is not automatically initiated when the mobile device is turned on, a button may be displayed on the opened web page indicating the availability of the clip mode app and asking the user to activate if he/she wishes to generate clips Once the clip mode app is initiated, the selected clips may be created with different sizes, to enable easy viewing of their respective necessary contents. In addition, the clip mode app may be configured to automatically store or cancel a created clip. For example, the created clip may be automatically canceled if the created clip has not been dragged on the display screen for an elapsed time period that exceeds a predetermined time period, or if no other clip has been created for another predetermined time period. Alternatively, the created clip may be automatically stored if the created clip has been moved on the display screen within an elapsed time period that does not exceed the predetermined time period, or if another clip has been created within the predetermined time period. As stated above the selection of a clip may be performed via a voice command. As such, when the clip mode app is initiated, an operating system ("OS") of a computing device can initiate an audio sensing service that is configured to detect a selection by the user of a particular part of a screen. This audio detection may work in a similar way the OS detects a click on a text box and opens a keyboard.

Figure 6:
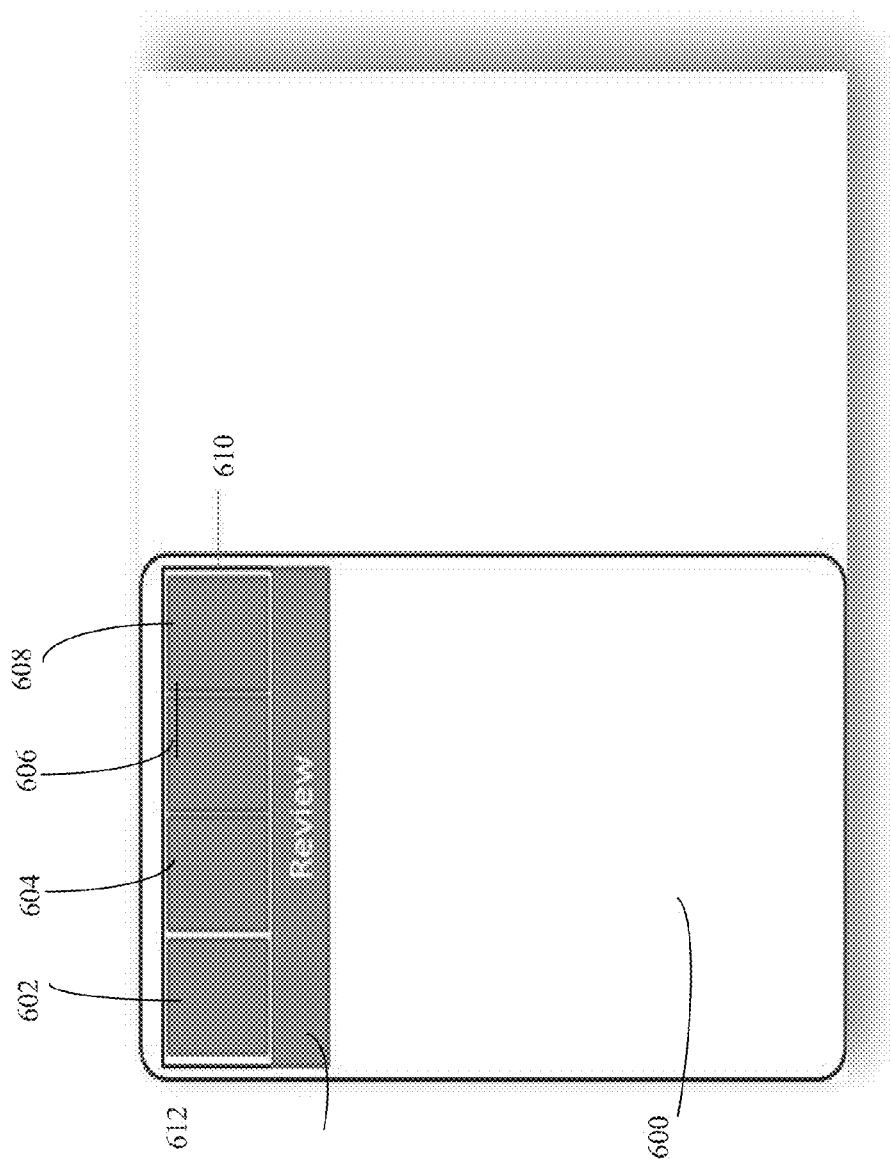
FIG. 6 illustrates a display screen having a plurality of shrunk clips docked in a clip window, which is positioned on a top side of the display screen and includes a review bar for enabling the user to display the clips on most of the display screen.

FIG. 6 illustrates an exemplary display screen 600 having a plurality of shrunk clips. The display screen 600 may correspond to the display screen of a mobile device and includes a clip window 610. The clip window 610 includes shrunk clips 602, 604, 606, and 608 and a review bar 612. As shown, the clips 602, 604, 606, and 608 are positioned on top side of the display screen 600. Each clip 602, 604, 606, and 608 may be created in response to the user viewing a user interface or a web page and creating a clip associated with the viewed user interface or the web page. To illustrate further, the user may initiate the clip mode app and may select a particular part of a user interface to create a clip using the initiated clip mode app. The clip mode app then creates a corresponding clip 602. The clip 602 may be kept floating where it was created or may be docketed to a preferred area of the user interface. In accordance with the present disclosure, the clip mode app is configured to automatically dock clip 602 in one desirable area of the displayed user interface, such as the top side as shown on the display screen 600. As the user continues to select additional particular parts of the same user interface or of other user interfaces, the clip mode app creates additional clips 604, 606, and 608. Similar to clip 602, clips 604, 606, and 608 may be kept floating in the area in which they were created or may be docketed to a preferred area of the user interface. As noted above, the clip mode app can be configured to automatically docket clips 604, 606, and 608 in desirable areas of the displayed user interface next to clip 602 as shown on the display screen 600. To this end, clips 602-608 may be arranged side-by-side within a clip window 610. As the number of clips increases and passes the allowable display area of the window 610, a scroll bar may be added to allow the user to view the clips that are not within the display area of the window 610.

As noted above, the window 610 also includes a review bar 612. The review bar 612 when selected triggers a rearrangement of the locations of the created clips 602, 604, 606, and 608. This functionality is described in more detail with respect to FIG. 7.

Figure 7:
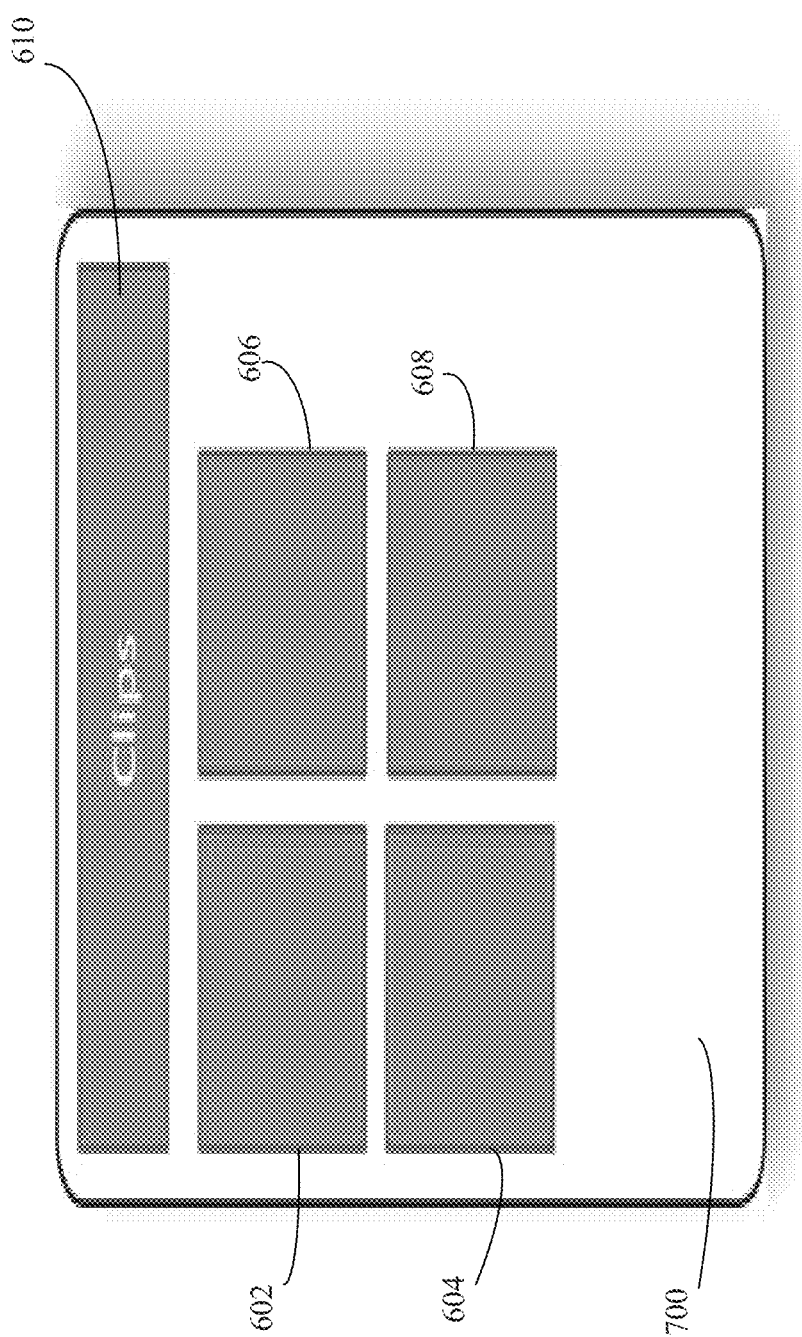
FIG. 7 illustrates a display screen whereon the plurality of clips of FIG. 6 have been expanded and displayed side by side.

FIG. 7 illustrates an exemplary display screen 700 showing arrangement of the plurality of clips when the review bar window 612 is activated in FIG. 6. Once the clip review option has been triggered, the clip mode app is configured to display side-by-side the created clips 602, 604, 606, and 608 to enable the user to review them all together. This may allow the user compare respective contents of the clips 602, 604, 606, and 608, which may lead to a decision to purchase one of the displayed devices, for example. Alternatively, in case the number of created clips included in the clip window 610 is larger than the viewable portion of the display screen, then the clip mode app is configured to display in a viewably convenient manner only a smaller set of the created clips, and enable the user to scroll across them to display other subsets of the created clips.

Though the above-discussion was directed to creating and facilitating the viewing of multiple clips that include necessary information for a desirable product, such as a mobile device, this process can be used to facilitate the creation of clips for any desirable item, such as physical items, media items, etc. Moreover, in lieu of accessing a site or an app to display a user interface from which a clip can be created, the user may contact by phone a vendor of a desired item, and type on a word screen information obtained during the phone conversation with the vendor. The user can then save all of or a particular part of the typed information as a clip, which will be added to an on-going clip window.

Figure 8:
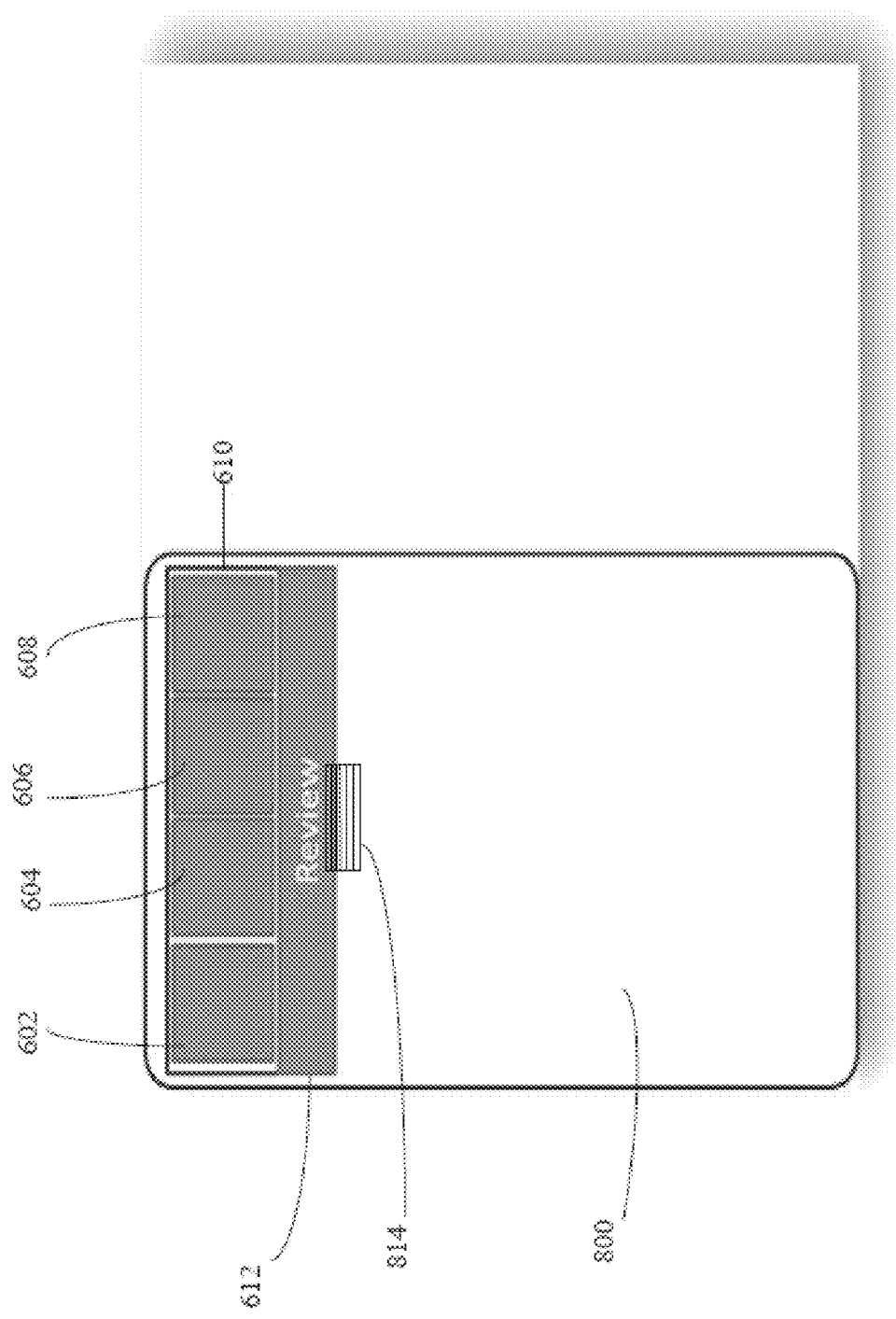
FIG. 8 illustrates a clip window having a handle item for sliding the clip window in and out of the display screen.

FIG. 8 illustrates an exemplary screen 800 that includes clip window 610 shown in FIG. 6. In FIG. 8, however, the window 610 also includes a handle item 814. The handle 814 is configured to remain on display when clip window 610 is slid-out of the display screen by the user, thereby increasing the viewable area of the displayed user interface. In another example, as the number of clips keeps increasing, the clip mode app may be configured to automatically slid-out clip window 610 and keep handle item 814 on display in order to trigger either a slide in of clip window 610 when desired.

Figure 9:
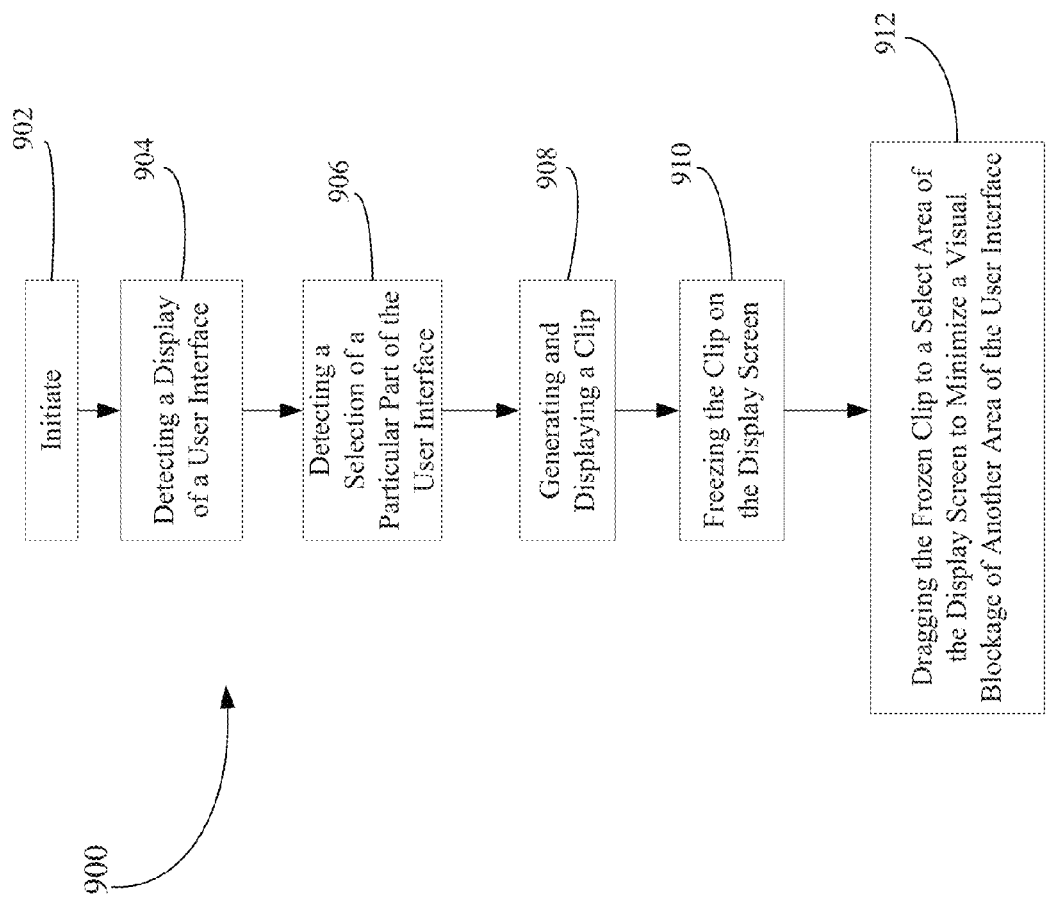
FIG. 9 is a flow chart of an exemplary implementation of a process for generating and maintaining a clip representing a selected portion of a user interface on a display screen until canceled.

FIG. 9 illustrates an exemplary process/method 900 for generating and maintaining a clip that includes a particular portion of a user interface on a display screen until canceled. The process 900 begins with a user who is seeking a particular item may initiate the clip mode app, at Step 902. The particular item may be found in at least one web site. The user may access a plurality of web sites via a browser application installed on the computing device in order to select a couple of web pages that he/she would like to view as user interfaces on the display screen of the computing device because they include the particular item or similar items and relevant information.

Once the user triggers the display of the user interface, a processor associated with the computing device is configured to display the user interface on the display screen of the computing device, at Step 904. During a review of the user interface, the user may perform a selection of a particular part/portion of the user interface that includes at least the relevant information about the particular item, which will be detected by the processor, at Step 906. Upon this detection, the processor is configured to generate and display a clip, which includes the selected portion of the user interface (i.e., a screen shot of the selected particular portion) as content, at Step 908. In one exemplary implementation, after the user has touched a particular position of the user interface for a predetermined amount of time, the processor is configured to generate a list of operation inputs by the user, each of which is configured to trigger a generation of the clip that includes a portion of the user interface surrounding the location of the user touch.

Subsequently, the processor is configured to automatically freeze the clip on the display screen so that it remains thereon until cancelled, even if the associated user interface is no longer displayed, at Step 910. Alternatively, the processor is configured to display after the generation of the clip another list of operation inputs by the user, each of which is configured to trigger a freezing of the generated clip. To enhance a view of the remaining part of the user interface, the user can drag and position the frozen clip at a desirable position of the display screen to minimize a visual blockage of another area of the user interface, at Step 912. Alternatively, in accordance with one exemplary implementation of the present disclosure, the processor is configured to compare the content of the frozen clip with the content of the remaining part of the display screen, and determine an area of the display screen where to position the frozen clip to minimize a visual blockage of another area of the user interface that may include comparable information.

Figure 10:
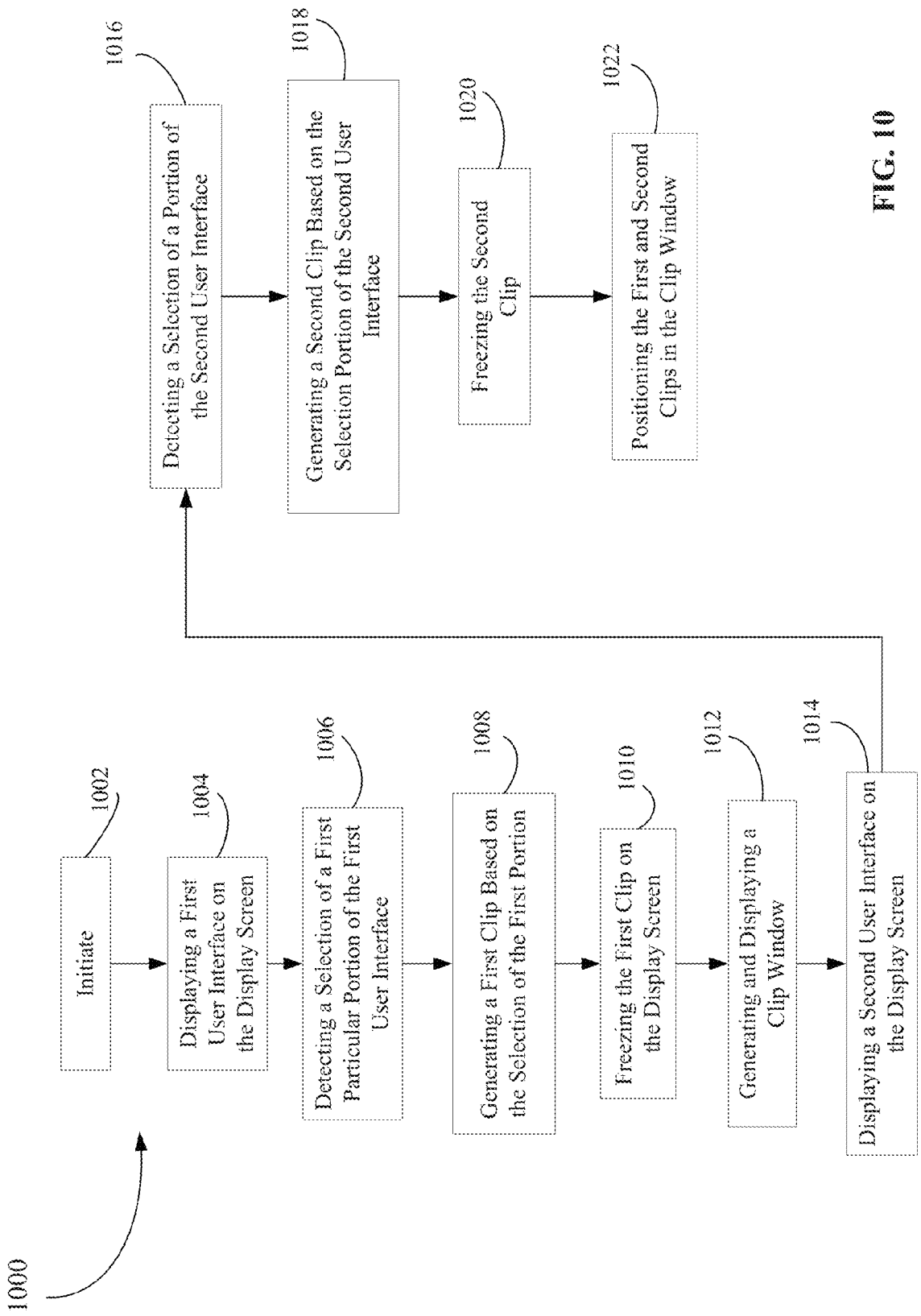
FIG. 10 is a flow chart of an exemplary implementation of a process for selecting and maintaining a plurality of clips representing selected portions of different user interfaces to remain on the display screen until canceled.

FIG. 10 illustrates an exemplary process/method 1000 for selecting and maintaining a plurality of clips representing selected portions of different user interfaces to remain on the display screen until canceled. The process 1000 begins with a user who is seeking a particular item may initiate the clip mode app, at Step 1002. Similar to process 900, the user may trigger a display of a first user interface on the display screen of a computing device, from which he/she can select a portion to trigger a generation of a first clip that includes the selected portion as a first content.

Once the user triggers the display of the first user interface, the processor associated with the computing device is configured to display the first user interface on the display screen of the computing device, at Step 1004. During a review of the user interface, the user may perform a selection of a particular portion of the first user interface that includes at least the relevant information about the particular item, which will be detected by the processor, at Step 1006. Subsequently, the processor is configured to generate a first clip that includes the selected portion of the first user interface, such as a screen shot of the selected portion, at Step 1008, and mark the first clip to remain on the display screen (i.e., freeze the first clip thereon) until cancelled, at Step 1010. Subsequently, the processor is configured to generate and display a clip window on the display screen, at Step 1012. The clip window may be positioned at a predetermined side/location of the display screen or based on where the portion of the user interface was selected.

The user may trigger a display of a second user interface on the display screen, from which he/she can select a portion to trigger a generation of a second clip that includes the selected portion as a second content. Once the user triggers the display of the second user interface, the processor associated with the computing device is configured to display the second user interface on the display screen of the computing device, at Step 1014. During a review of the second user interface, the user may perform a selection a portion of the second user interface that includes at least the relevant information about the particular item, which is detected by the processor, at Step 1016. Upon this detection, the processor is configured to generate and display a second clip, which includes the selected portion of the second user interface as a second content, at Step 1018. Alternatively, the processor is configured to compare the content of the first clip to that of the second user interface, and generate a specific comparison that is pulled up in a new clip (e.g., pricing). Moreover, the processor is configured to include the website name for each corresponding clip. As performed for the first clip, the processor is configured to freeze the second clip on the display screen, at Step 1020. Then, in order to minimize a visual blockage of the second user interface, or of a third display screen that may have been displayed after the generation of the second clip on the display screen, the processor is configured to move and position the first and second clips within the clip window, at Step 1022.

In one example, the processor may be configured to move each of the clips within the clip window once they are created, or wait until a predetermined number of clips have been created. In addition, the location of the clip window on the display can be chosen and modified by the user. As stated above, the clip window may include a review button, which is used when activated to trigger a side by side display of the first and second clips on the display.

As stated above, the clip generating application may be downloaded from a mobile service carrier to the computing device. In one example, after being downloaded, when the clip application is first triggered on the computing device, a list of predetermined user operation inputs is displayed on the display screen of the computing device for selection by the user for generating, freezing, and cancelling a clip or a group of clips. After displaying the list of predetermined user operation inputs, the clip application instructs via a display or an audio signal output the user how to select a particular set of predetermined operation inputs and how to modify them going forward. Alternatively, the clip application may instruct the user how to set predetermined user operation inputs by entering desirable screen touches, mouse clicks, audible statements inputs for each one of a generation, a freezing, and a cancelling of a clip or a of group of clips.

As stated above, the clip generating application may be downloaded from a mobile service carrier to the computing device. FIG. 11A provides a block diagram illustration of an exemplary non-touch type mobile station 13*a*. Although the mobile station 13*a* may be a smart-phone or may be incorporated into another device, such as a personal digital assistant (PDA) or the like, for discussion purposes, the illustration shows the mobile station 13*a* is in the form of a handset. The handset example of the mobile station 13*a* functions as a normal digital wireless telephone station. For that function, the station 13*a* includes a microphone 102 for audio signal input and a speaker 1104 for audio signal output. The microphone 1102 and speaker 1104 connect to voice coding and decoding circuitry (vocoder) 1106. For a voice telephone call, for example, the vocoder 1106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 13*a* also includes at least one digital transceiver (XCVR) 1108. Today, the handset 13*a* would be configured for digital wireless communications using one or more of the common network technology types. The concepts discussed here encompass examples of the mobile station 13*a* utilizing any digital transceivers that conform to current or future developed digital wireless communication standards. The mobile station 13a may also be capable of analog operation via a legacy network technology.

The transceiver 1108 provides two-way wireless communication of information, such as vocoded speech samples and/or digital information, in accordance with the technology of the network 15. The transceiver 1108 also sends and receives a variety of signaling messages in support of the various voice and data services provided via the mobile station 13a and the communication network. Each transceiver 1108 connects through RF send and receives amplifiers (not separately shown) to an antenna 1110. The transceiver may also support various types of mobile messaging services, such as short message service (SMS), enhanced messaging service (EMS) and/or multimedia messaging service (MMS).

The mobile station 13a includes a display 1118 for displaying messages, menus or the like, call related information dialed by the user, calling party numbers, etc. A keypad 1120 enables dialing digits for voice and/or data calls as well as generating selection inputs, for example, as may be keyed-in by the user based on a displayed menu or as a cursor control and selection of a highlighted item on a displayed screen. The display 1118 and keypad 1120 are the physical elements providing a textual or graphical user interface. Various combinations of the keypad 1120, display 1118, microphone 1102 and speaker 1104 may be used as the physical input output elements of the graphical user interface (GUI), for selecting and freezing particular parts of screens. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during the selection and freezing process.

A microprocessor 1112 serves as a programmable controller for the mobile station 13a, in that it controls all operations of the mobile station 13a in accord with programming that it executes, for all normal operations, and for operations involved in the selection and freezing procedure under consideration here. In the example, the mobile station 13a includes flash type program memory 1114, for storage of various "software" or "firmware" program routines and mobile configuration settings, such as mobile directory number (MDN) and/or mobile identification number (MIN), etc. The mobile station 13a may also include a non-volatile random access memory (RAM) 1116 for a working data processing memory. Of course, other storage devices or configurations may be added to or substituted for those in the example. In a present implementation, the flash type program memory 1114 stores firmware such as a boot routine, device driver software, an operating system, call processing software and vocoder control software, and any of a wide variety of other applications, such as client browser software and short message service software. As shown, the flash type program memory 1114 includes the clip generating application 1117. The memories 1114, 1116 also store various data, such as telephone numbers and server addresses, downloaded data such as multimedia content, and various data input by the user. Programming stored in the flash type program memory 1114, sometimes referred to as "firmware," is loaded into and executed by the microprocessor 1112.

As outlined above, the mobile station 13a includes a processor, and programming stored in the flash memory 1114 configures the processor so that the mobile station is capable of performing various desired functions, including in this case the functions involved in the technique for selecting and freezing particular parts of screens.

Figure 11B:
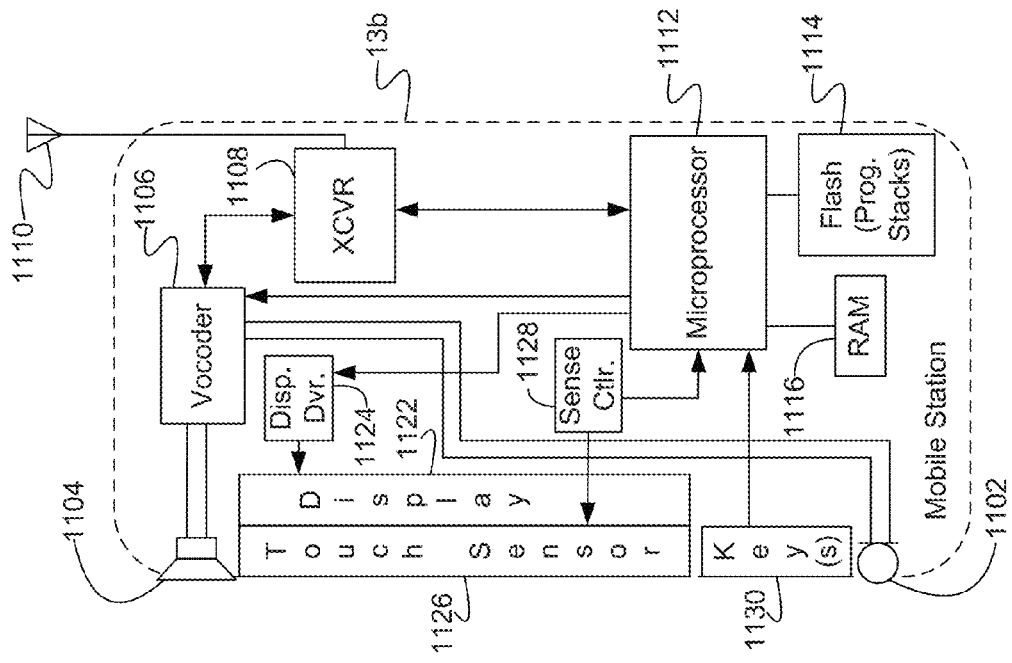
FIG. 11B is a high-level functional block diagram of an exemplary touch screen type mobile station used to select and freeze a particular part of a display screen.
Figure 11A:
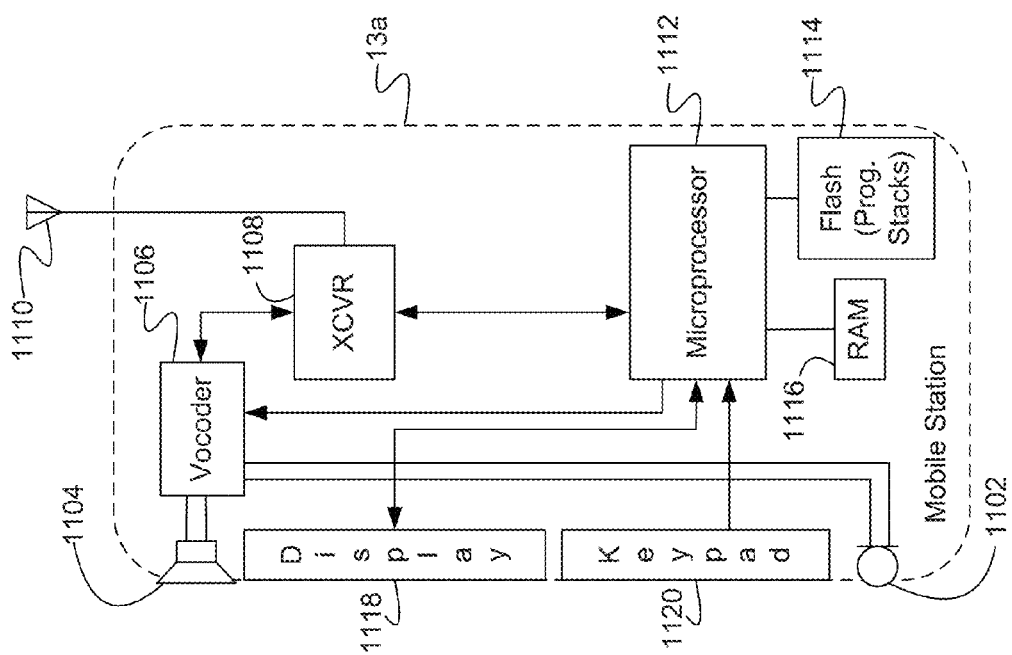
FIG. 11A is a high-level functional block diagram of an exemplary non-touch type mobile station used to select and freeze a particular part of a display screen.

For purposes of such a discussion, FIG. 11B provides a block diagram illustration of an exemplary touch screen type mobile station 13b. Although possible configured somewhat differently, at least logically, a number of the elements of the exemplary touch screen type mobile station 13b are similar to the elements of mobile station 13a, and are identified by like reference numbers in FIG. 11A. For example, the touch screen type mobile station 13b includes a microphone 1102, speaker 1104 and vocoder 1106, for audio input and output functions, much like in the earlier example. The mobile station 13b also includes at least one digital transceiver (XCVR) 1108, for digital wireless communications, although the handset 13b may include an additional digital or analog transceiver. The concepts discussed here encompass examples of the mobile station 13b utilizing any digital transceivers that conform to current or future developed digital wireless communication standards. As in the station 13a, the transceiver 108 provides two-way wireless communication of information, such as vocoded speech samples and/or digital information, in accordance with the technology of the network 15. The transceiver 1108 also sends and receives a variety of signaling messages in support of the various voice and data services provided via the mobile station 13b and the communication network. Each transceiver 1108 connects through RF send and receive amplifiers (not separately shown) to an antenna 1110. The transceiver may also support various types of mobile messaging services, such as short message service (SMS), enhanced messaging service (EMS) and/or multimedia messaging service (MMS).

As in the example of station 13a, a microprocessor 1112 serves as a programmable controller for the mobile station 13b, in that it controls all operations of the mobile station 13b in accord with programming that it executes, for all normal operations, and for operations involved in the selecting and freezing particular parts of screens procedure under consideration here. In the example, the mobile station 13b includes flash type program memory 1114, for storage of various program routines and mobile configuration settings. As shown, the flash type program memory 1114 includes the clip generating application 1117. The mobile station 13b may also include a non-volatile random access memory (RAM) 1116 for a working data processing memory. Of course, other storage devices or configurations may be added to or substituted for those in the example. Hence, outlined above, the mobile station 13b includes a processor, and programming stored in the flash memory 1114 configures the processor so that the mobile station is capable of performing various desired functions, including in this case the functions involved in the technique for selecting and freezing particular parts/portions of user interfaces.

In the example of FIG. 11A, the user interface elements included a display and a keypad. The mobile station 13b may have a limited number of key 1130, but the user interface functions of the display and keypad are replaced by a touchscreen display arrangement. At a high level, a touchscreen display is a device that displays information to a user and can detect occurrence and location of a touch on the area of the display. The touch may be an actual touch of the display device with a finger, stylus or other object, although at least some touchscreens can also sense when the object is in close proximity to the screen. Use of a touchscreen display as part of the user interface enables a user to interact directly with the information presented on the display.

Hence, the exemplary mobile station 13b includes a display 1122, which the microprocessor 1112 controls via a display driver 1124, to present visible outputs to the device user. The mobile station 13b also includes a touch/position sensor 1126. The sensor 1126 is relatively transparent, so that the user may view the information presented on the display 122. A sense circuit 1128 sensing signals from elements of the touch/position sensor 1126 and detects occurrence and position of each touch of the screen formed by the display 1122 and sensor 1126. The sense circuit 1128 provides touch position information to the microprocessor 1112, which can correlate that information to the information currently displayed via the display 1122, to determine the nature of user input via the screen.

The display 1122 and touch sensor 1126 (and possibly one or more keys 1130, if included) are the physical elements providing the textual and graphical user interface for the mobile station 13b. The microphone 1102 may be used as an additional user interface element, for audio input, with respect to selecting and freezing particular parts of screens functions. The structure and operation of the mobile stations 13a and 13b, as outlined above, were described to by way of example, only.

FIG. 12A depicts a computer with user interface elements, as may be used to implement a personal computer or other type of work station or terminal device, although the computer of FIG. 12A may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 12A). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the processes/methods of selecting and freezing particular parts of screens outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the selecting and freezing particular parts of screens application into the computer platform of the mobile stations 13a and 13b. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the selecting and freezing particular parts of screens application. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Figure 13:
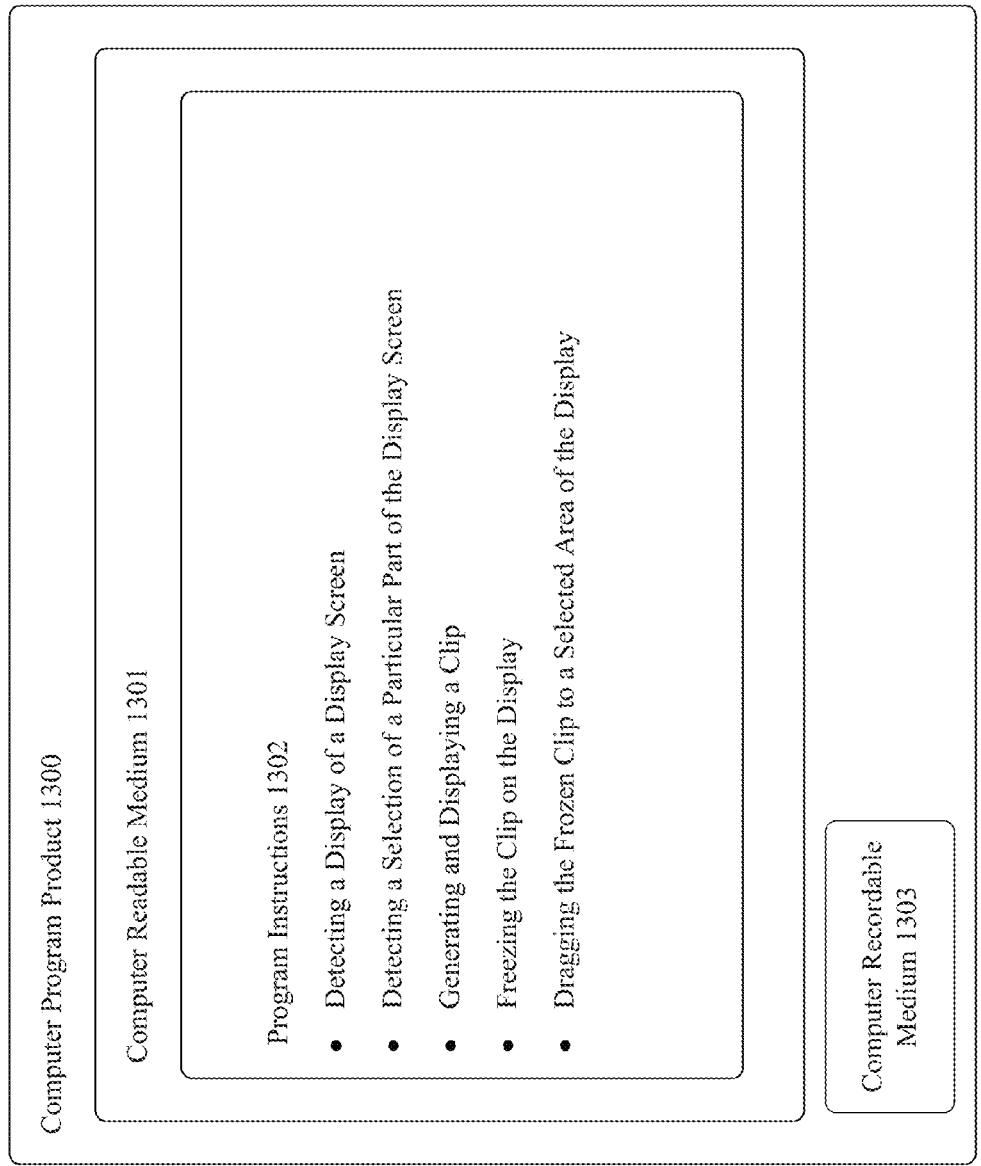
FIG. 13 is a schematic diagram illustrating a conceptual partial view of an example computer program product.

In some examples, the discussed methods may be implemented as computer program instructions encoded on a computer-readable storage media in a machine-readable format. FIG. 13 is a schematic diagram illustrating a conceptual partial view of an example computer program product 1300 that includes a computer program for executing a computer process on a computing device, arranged according to at least some examples presented herein. The example computer program product 1300 may be provided using a non-transitory computer readable medium 1301. The non-transitory computer readable medium 1301 may include one or more programming instructions 1302 that, when executed by one or more processors may provide functionality or portions of the functionality described above with respect to FIGS. 4a-12. Thus, for example, referring to the example shown in FIGS. 9 and 10, one or more features of blocks 902, 904, 906, 908, 910 and/or 912, and one or more features of blocks 1002, 1004, 1006, 1008, 1010, 1012, 1014, 1016, 1018, 1020 and/or 1022 may be undertaken by one or more instructions associated with the non-transitory computer readable medium 1301.

In some implementations, the non-transitory computer readable medium 1301 may encompass a computer recordable medium 1303, such as, but not limited to, memory, read/write (R/W) CDs, R/W DVDs, etc. The one or more programming instructions 1302 may be, for example, computer executable and/or logic implemented instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A method comprising:
   displaying via a processor a user interface on a display screen of a computing device;
   detecting a selection of a portion of the user interface;
   generating a clip that includes the selected portion of the user interface as content;
   displaying the generated clip on the display screen;
   determining, by the processor, a location on the display screen at which to position the displayed clip, wherein determining the location comprises comparing, by the processor, the content of the clip with other content that is displayed on the display screen concurrently with the clip and determining whether the other content includes information that is relevant to the content of the clip;
   positioning, by the processor, the clip at the determined location; and
   maintaining the display of the generated clip on the display screen even after the user interface is no longer displayed on the display screen.

2. The method of claim 1, wherein the user interface corresponds to a web page of a web site accessed by a browser application of the computing device via a communication network.

3. The method of claim 1, wherein the computing device includes a mobile phone.

4. The method of claim 3, wherein the user interface is displayed on the display screen in response to activation of an application on the mobile phone.

5. The method of claim 1, further comprising:
   receiving a request to display an additional user interface; and
   responsive to the request, displaying the additional user interface on the display screen of the computing device, wherein the other content is content of the additional user interface, and
   wherein if it is determined that the content of the additional user interface includes information that is relevant to the content of the clip, positioning the clip at the determined location comprises positioning the clip such that the relevant information of the additional user interface is visible on the display screen when the clip is positioned at the determined location.

6. The method of claim 5, further comprising:
   detecting a selection of a portion of the additional user interface on the display screen of the computing device;

generating an additional clip that includes the selected portion of the additional user interface as an additional content;
displaying the generated additional clip on the display screen; and
maintaining the display of the generated additional clip and the generated clip on the display screen even after the additional user interface is no longer displayed on the display screen.

7. The method of claim 1, wherein the clip remains on a top layer of the display screen until receiving inputs to cancel the display of the clip.

8. The method of claim 1, further comprising:
removing the clip from the display screen when there has been no detection of a selection of the clip on the display screen for a first predetermined time period, or when there has been no generation of an additional clip in response to a selection of an additional portion of the user interface or of an additional user interface for a second predetermined time period.

9. The method of claim 1, wherein the selection of the portion of the user interface is performed by a first touch gesture on the display screen, by a first detectable activity on a touch pad, or by a first voice command.

10. The method of claim 1, further comprising:
altering the generated clip to become partially transparent.

11. A method comprising:
displaying via a processor a first user interface and a second user interface on a display screen of a computing device;
detecting a selection of a portion of the first user interface on the display screen of the computing device;
generating a first clip that includes the selected portion of the first user interface as a first content;
displaying the generated first clip on the display screen;
detecting a selection of a portion of the second user interface on the display screen of the computing device;
generating a second clip that includes the selected portion of the second user interface as a second content;
displaying the generated second clip on the display screen;
determining, by the processor, a location on the display screen at which to position the displayed first clip or the displayed second clip, wherein determining the location comprises comparing, by the processor, the first content or the second content with other content that is displayed on the display screen concurrently with the first clip or the second clip, and determining whether the other content includes information that is relevant to the first content or the second content;
positioning, by the processor, the first clip or the second clip at the determined location, and
maintaining the display of the first clip and second clips on the display screen even after the first user interface and the second user interface are no longer displayed on the display screen.

12. The method of claim 11, wherein the first user interface and the second user interface respectively correspond to a first web-page and a second web-page accessed by a browser application of the computing device through a communication network.

13. The method of claim 11, wherein the computing device includes a mobile phone.

14. The method of claim 11, further comprising:
receiving a request via the display screen of the computing device to display a third user interface; and responsive to the request, displaying the third user interface on the display screen of the computing device,
wherein the other content is content of the third user interface, and
wherein if it is determined that the content of the third user interface includes information that is relevant to the first content or the second content, positioning the first clip or the second clip at the determined location comprises positioning the first clip or the second clip such that the information of the third user interface that is relevant to the first content or the second content is visible on the display screen when the first clip or the second clip is positioned at the determined location.

15. The method of claim 14, further comprising:
detecting a selection of a portion of the third user interface on the display screen of the computing device;
generating a third clip configured to include the selected portion of the third user interface as a third content; and
displaying the generated third clip on the display screen,
wherein the first clip, the second clip, and the third clip remain displayed on the display screen of the computing device even after the first user interface, the second user interface, or the third user interface is no longer displayed on the display screen.

16. A method comprising:
displaying via a processor a first user interface on a display screen of a computing device;
detecting a selection of a portion of the first user interface on the display screen;
generating a first clip that includes the selected portion of the first user interface as a first content;
displaying the generated first clip on the display screen;
generating and displaying a clip window on the display screen and positioning the first clip within the clip window;
maintaining the display of the first clip on the display screen even when the first user interface is no longer displayed on the display screen, wherein the first clip remains on the display screen until receipt of cancelling inputs to remove the first clip;
displaying via a processor a second user interface on the display screen of the computing device;
comparing the first content with content of the second user interface;
determining that a portion of the second user interface includes information that is relevant to the first content;
generating a second clip that includes a second content, the second content comprising the information in the portion of the second user interface that is relevant to the first content;
displaying the generated second clip on the display screen;
positioning the second clip within the clip window; and
maintaining the display of the second clip on the display screen even when the second user interface is no longer displayed on the display screen, wherein the second clip remains on the display screen until receipt of cancelling inputs to remove the second clip.

17. The method of claim 16, wherein the clip window is generated and displayed automatically upon detection of the generation of the first clip or of the second clip.

18. The method of claim 16, wherein the positioning of the first and second clips in the clip window includes reducing their respective size in order to increase a viewable area of the first user interface, of the second user interface, or of a third user interface that is currently displayed on the display.

19. The method of claim 16, wherein the generation of the clip window is triggered upon receipt of inputs from the user to generate the clip window.

20. The method of claim 16, wherein the clip window includes a review button to trigger a side by side display of the first and second clips with a selectable size on the display screen.

\* \* \* \* \*